United States Patent [19]

Ausseil

[11] 4,389,104
[45] Jun. 21, 1983

[54] MICROFILM CASSETTE AND THE PROJECTION APPARATUS FOR THE VIEWING OF SAME

[76] Inventor: Dominique Ausseil, 16, Allée de la Teurtais, 35300 Fougeres, France

[21] Appl. No.: 197,574

[22] Filed: Oct. 16, 1980

[51] Int. Cl.³ .................. G03B 21/11; G03B 21/28; G03B 23/02
[52] U.S. Cl. .................. 353/26 R; 242/71.2; 353/78; 206/387
[58] Field of Search .................. 206/387; 242/71.2; 353/26 R, 122, 78

[56] References Cited

U.S. PATENT DOCUMENTS

| | | | |
|---|---|---|---|
| 3,347,142 | 10/1967 | Steisslinger | 242/71.2 |
| 3,638,875 | 2/1972 | Schwartz et al. | 242/71.2 |
| 3,677,487 | 7/1972 | Knowles et al. | 242/71.2 |
| 3,785,728 | 1/1974 | Peters | 353/26 R |
| 3,785,729 | 1/1974 | Dasher et al. | 242/71.2 |
| 3,951,536 | 4/1976 | Becker | 353/26 R |
| 4,247,183 | 1/1981 | Thompson | 353/122 |

*Primary Examiner*—William T. Dixson, Jr.
*Attorney, Agent, or Firm*—Laff, Whitesel, Conte & Saret

[57] ABSTRACT

A cassette is fitted with two cylindrical chambers, each of which has, in its center, a spool axis or shaft. The width of the cassette is slightly greater than the width of a strip of microfilm. The two chambers are joined by a pair of separate, flat plates, which extend the walls of the chambers so that the strip of film runs between the two plates, with a window in the central zone of the two plates. The width of the interval between the two plates is small, to press the film accurately into place at a focal plane of the optical system of a microfilm projector. The apparatus for the use of the cassette makes it possible to cause the film to circulate in both directions.

9 Claims, 8 Drawing Figures

MICROFILM CASSETTE AND THE PROJECTION APPARATUS FOR THE VIEWING OF SAME

The present invention relates to a microfilm cassette which may be either put into or removed from a reading apparatus without having to rewind the film. It also relates to means which make it possible to conduct a search through film in, such a cassette.

Known microfilm cassettes comprise only one magazine. To read the film, it is necessary to engage a starting strip on a receiver spool. To remove the film, it is first necessary to rewind the entire film into the loader. Those maneuvers require a non-negligible time and require the operator to handle the film with two hands.

One object of the present invention is to provide a microfilm cassette which avoids those drawbacks, and which is easy and fast to handle.

According to a characteristic of the invention, a microfulm cassette, which is similar to a magnetic tape cassette, has two magazines, each one of them having in its center a winding shaft. The width of the cassette is slightly greater than the width of the microfilm. The two magazines are joined by a pair of separate plates which extend the walls of the magazines, so that the film runs between the two plates, the central zone of the two plates being transparent.

According to another characteristic, the width of the interval between the two plates is small so that it presses against the film and thus accurately positions it in the light trajectory.

According to another characteristic, the apparatus for using the cassette comprises, in addition to the conventional optical devices, a chassis with two shafts capable of driving the spools of the cassette's magazines.

According to another characteristic, the apparatus comprises a cradle mounted on glides which make possible its transverse displacement. The cradle is fitted to receive the cassette and comprises an opening or a transparent zone facing the transparent zone of the cassette, with driving means for the transverse displacement of the cradle, the shafts of the chassis sliding into the shafts of the spools.

According to another characteristic, each shaft of the chassis can be driven only in its direction of the rewinding of the spool located in the corresponding magazine.

The above-mentioned characteristics of the present invention, as well as others, will appear more clearly a reading of the description of one embodiment, the description being given with respect to the attached drawing, in which.

Figure 1:
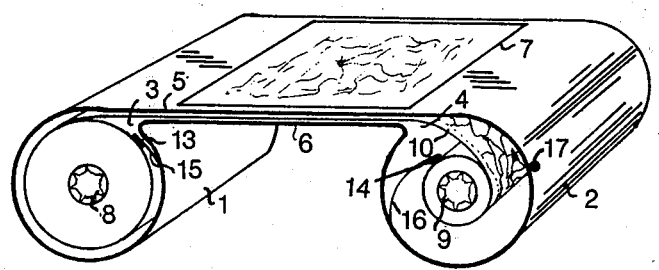
FIG. 1 is a schematic view, in perspective, of a microfilm cassette according to the present invention.

The cassette in FIG. 1 is formed of two partial cylinders 1 and 2, closed at their non-visible ends, and comprising the slit 3 in one and the slit 4, in the other cylinder. The edges of the slits 3 and 4 are respectively joined by plates 5 and 6. In their centers, as indicated by rectangle 7, the plates 5 and 6 are transparent.

In the centers of the closing plates, not shown, of cylinders 1 and 2, there are bearings, not represented, in which are mounted spool shafts 8 and 9. Shafts 8 and 9 are hollow, with longitudinal keying ribs and grooves on the inside, to make it possible to drive them. Film 10 runs between plates 5 and 6 and forms on two spools 11 and 12, respectively, around shafts 8 and 9. The space between plates 5 and 6 is reduced so that the plates serve as film-pressing device, for positioning the film with precision in the optical trajectory.

Of course, the space existing between the two cylinders 1 and 2, and below zone 7, must be free from any opaque obstacle, in order to let the light go through zone 7 and the film positioned therein. The rear closing plates, not represented, are closed by a veil is which closes the edges between plates 5 and 6. Such a veil also provided on the front face to make the cassette dust-proof.

Inside the cylinders, felts 13 and 14, respectively, are carried by springs 15 and 16, which, in turn, are respectively mounted, in a suitable manner, to ensure the tension of the windings on spools 11 and 12, and to prevent an ill-timed unwinding of the film. Another braking and dustproofing system for the spools can also be executed using two toric joints per spool, mounted, respectively, at the ends of the shafts of the spools, and which are in abutment with the front and rear veils.

On the external surface of each one the cylinders 1 and 2, there is provided, in a suitable location, which may be chosen close to the front of the cassette as indicated in FIG. 1, a hollow keeper 17 which cooperates with a locking ball detent, which will be seen below.

Figure 2:
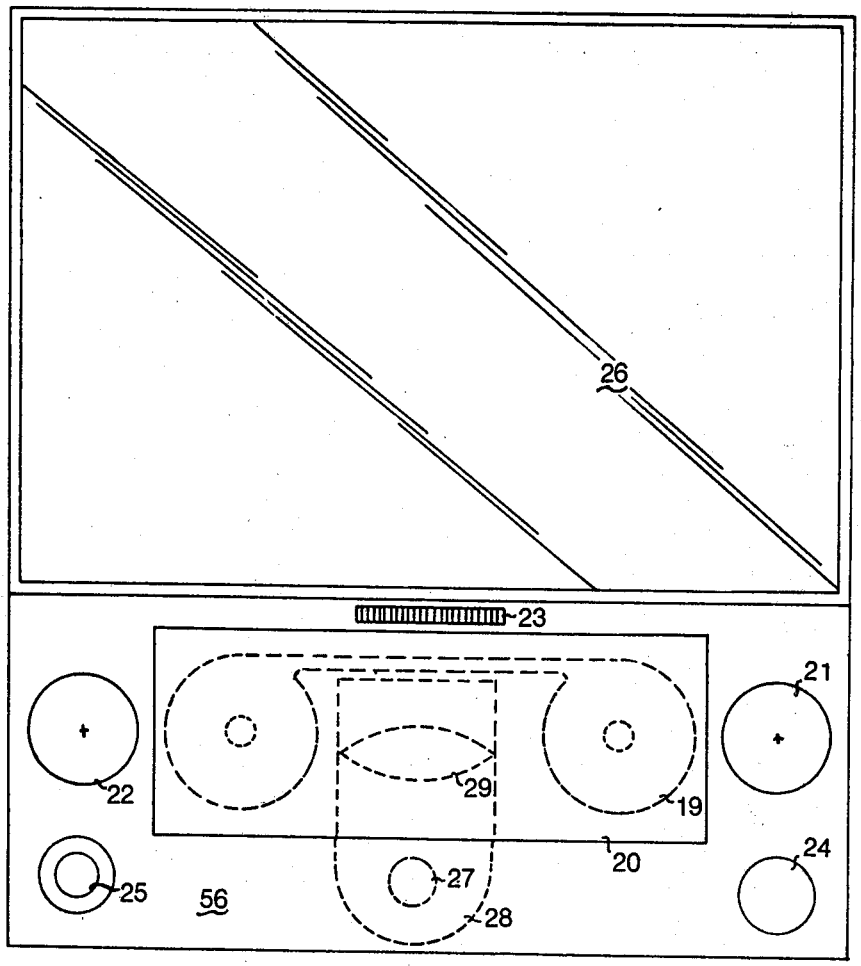
FIG. 2 is a schematic front view of an apparatus in which the cassette in FIG. 1, may be used.

In the representation of the projection apparatus in FIG. 2, there can be recognized a cassette 19 which is identical with the one in FIG. 1. This cassette is introduced and maintained in a casing, the opening of which is protected by a door 20. The front face of the apparatus comprises, further, a button 21 which governs the passing of the film in cassette 19, a button 22 which governs the translation of the cassette from the front to the rear (and vice-versa) in its casing, a button 23 which regulates the lens of the apparatus, a go-stop button 24 which also makes it possible to adjust the intensity of light, a 'on' signal 25 and a screen 26. In FIG. 2 there has also been represented in dash lines a halogen lamp 27, its reflector 28 and a condenser lens 29.

Figure 3:
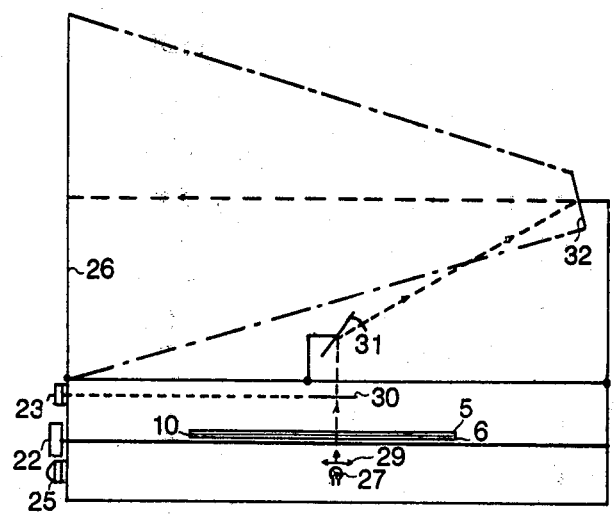
FIG. 3 is a schematic view, in section, of the apparatus in FIG. 2.

In the section view in FIG. 3, there is seen again, in the casing lamp 27, condenser lens 29, flats or plates 5 and 6 which hold the film 10, as if in a sandwich. A first mirror 31 sends back the light beam received from lamp 27 passing through film 10 toward a second mirror 32, which sends the light back to the rear face of screen 26. Buttons 23, 22 and signal 25 also are indicated in FIG. 2. The section view in FIG. 3 makes it possible to illustrate the optical functioning of the apparatus, which is entirely conventional.

Figure 4:
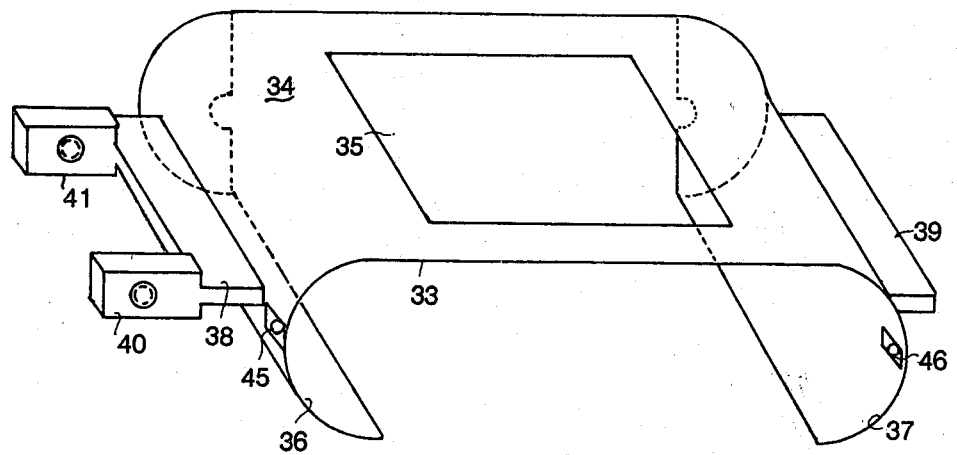
FIG. 4 is a schematic view, in perspective, of a cassette cradle used in the apparatus according to FIG. 2.

In FIG. 4, there has been represented in perspective a cradle for receiving cassette 19. It is essentially formed of a rigid sheet 33 comprising an upper flat face 34, with a window 35 corresponding to zone 7 of the cassette, the flat face being extended to the right and to the left by two half-cylinders 36 and 37. The common diameter of these half-cylinders corresponds to the common external diameter of cylinders 1 and 2. Each half-cylinder 36 or 37 carries on the outside, along its horizontal generatrix, a slider, 38 or 39 respectively. In addition, slider 38 has at its two ends, projecting toward the outside, two small blocks 40 and 41 which comprise threaded holes which are aligned and which define the axis of an endless feed screw 42, FIG. 6., driven by an operation of button 22. The rear ends of the half-cylinders 36 and 37 form veils presenting openings for shafts 43 and 44 which drive the shafts of spools 8 and 9. Finally, the cradle comprises, in front of sliders 38 and 39, lodgings for conventional locking ball detents 45 and 46, which may assume an unlocked position toward the outside and a locked position toward the inside. Locking systems others than the detent which has just been described could also be used.

Figure 5:
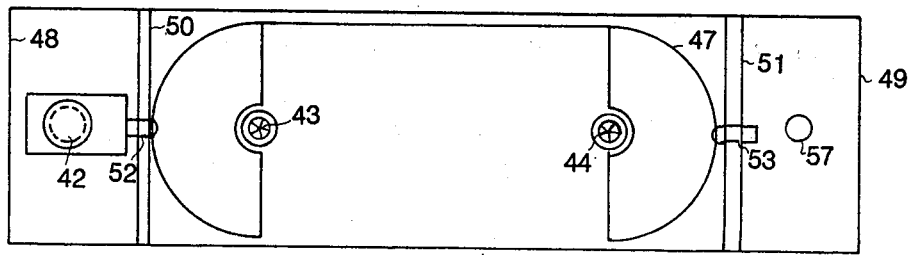
FIG. 5 is a front view of the cradle in FIG. 4.

In FIG. 5, there has been represented cradle 47 seen from the front, and mounted in the casing of the projection apparatus. That casing is limited by two lateral faces 48 and 49, but especially it comprises two vertical partitions, each of which has a horizontal groove 52 or 53. Inside the grooves, there are respectively sliders 38, 39.

Figure 6:
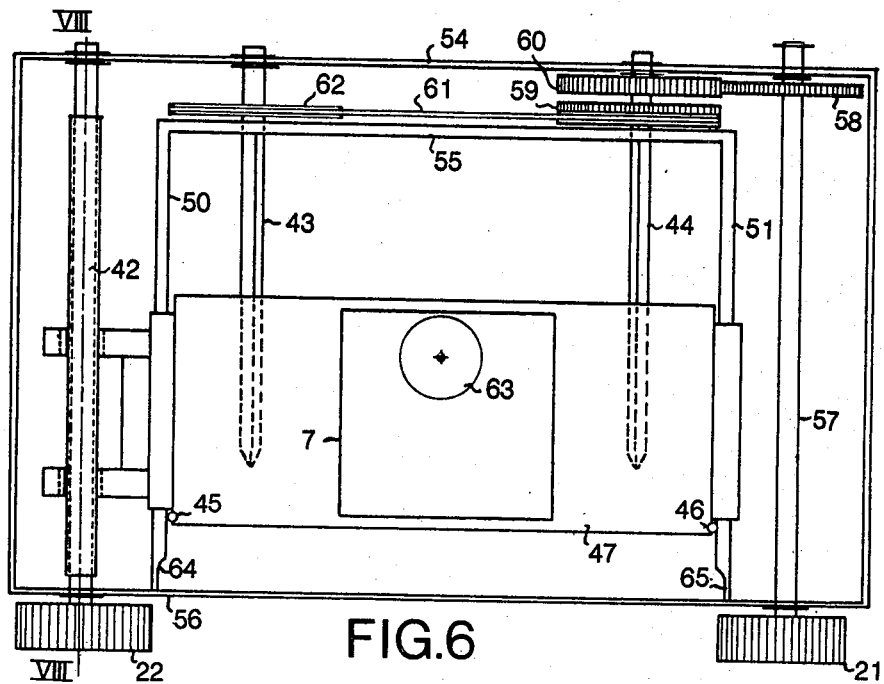
FIG. 6 is a schematic plan view of a chassis provided for the cradle in FIG. 4, in the apparatus according to FIG. 2.

The view from the top in FIG. 6 shows the other parts of the casing according to FIG. 5, that is to say back 54 and a vertical wall 55 are, perpendicular to walls 50 and 51, and are placed slightly forward of back 54, and a front face 56 into which there is cut out an opening for making it possible to introduce the cassette, the opening being normally closed by the door 20 in FIG. 2. Feed screw 42 is mounted at the end of which button 22, and is carried by bearings from back 54, and the front face 56. As screw 42 runs through the threaded holes of blocks 40 and 41, it is possible to displace in translation, by operating button 22, cradle 47 sliding in grooves 52 and 53. A shaft 57 is mounted at the end of which button 21, and is carried by bearings of back 54 and of the front face 56. Shaft 57 is fixed in solidary with a gear 58 close to back 54. Shaft 44 is carried or supported by bearings on back 54, and on wall 55. There are two gears 59 and 60 placed in front of each other between walls 54 and 55. Gear 59 comprises a circular groove on which there is mounted a belt 61 which runs over a pulley 62 mounted on the shaft 43 between walls 55 and 54. Shaft 43 is carried or supported by bearings on walls 54 and 55.

It appears in FIG. 6 that the depth of cradle 47 is in the order of one half of the depth of the volume defined by partitions or walls 50, 51 and 55. In that volume, the shafts 43 and 44 form pins on which fit the hollow shafts 8 and 9 of the cassette mounted in cradle 47. Shafts 43 and 44 of course have ribs and grooves, to drive shafts 8 and 9 into rotation.

Figure 7:
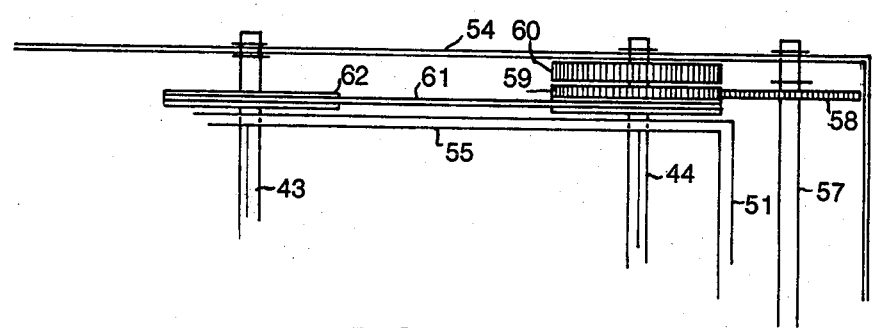
FIG. 7 is a partial schematic view of the cradle in FIG. 6, with a reversed gear position.

Shaft 57 now can rotate when button 21 is depressed, but it can be pushed in as shown in FIG. 6, a position in which its gear 58 engages gear 60 which is fixed on shaft 44, or it can be pulled toward the front, as shown in FIG. 7, a position in which its gear 58 engages gear 59 which is mounted, free to rotate, on shaft 44.

In the pushed down position, when button 21 is rotated in the counterclockwise, the film is wound around spool 9, driven by shaft 44. In the pulled out position, it is possible, by rotating button 21 in the opposite or clockwise direction, to rewind the film around spool 8, driven by shaft 43, pulley 62, belt 61 and gear 59. A wrong maneuver is easily detected because the film does not move.

It thus appears that by maneuvering button 21 it is possible to cause the film to run under area 63, from the right to the left, or from the left to the right. In addition, by maneuvering button 22, there is a translation of cradle 47 which carries the cassette that is to say the film, is displaced from the front to the rear or vice-versa under area 63. Area 63 is located on the optical axis of the apparatus. Thus buttons 21 and 22 make it possible to center the image on screen 10.

Figure 8:
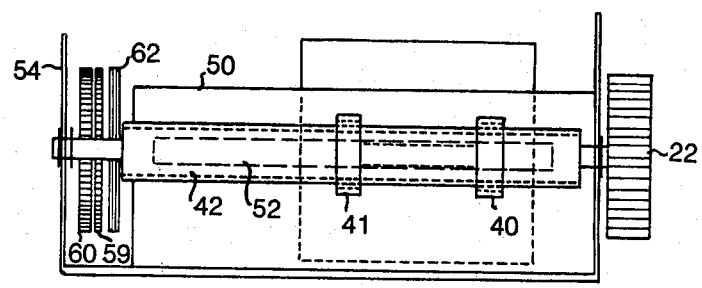
FIG. 8 is a cross section view of the chassis in FIG. 6, taken along line VIII—VIII.

FIG. 8 is a section view taken along the line VIII—VIII in FIG. 6, in which there are found again button 22, shaft 42, the blocks 40 and 41, and partition 50.

With reference again to FIG. 6, it appears that the internal front parts of walls 50 and 51 are made thinner in areas 64 and 65, to make it possible for locking devices 45 and 46 to disappear.

In order to use the projection apparatus with film cassettes, according to the present invention, the empty cradle, by means of button 22, is displaced forward. It is assumed that grooves 52 and 53 (FIG. 5) are closed toward the front in order to form an abutment. When the cradle has come against the abutment, the locking devices 45 and 46 move into spaces 64, 65 and are unlocked, this making it possible to introduce the cassette into the cradle. The cradle is pushed in completely. Afterwards, as soon as the cradle which contains the cassette moves back, the locking system 45, 46 move out of spaces 64, 65 and immobilizes the cassette in the cradle.

As a function of the picture projected, the operator either unwinds or winds the film. It is possible to provide, for example, on the edge of the film for a footage marking. Once the desired image zone has been found, the image is centered by means of buttons 21 and 22; then, button 23 may be used to permit a change of lens and ensure the correct magnifying power of the image which has to be consulted.

It must further be understood that the cassette and the apparatus make it possible to view the microfilm either over its entire width and over a length which is the equivalent of the transparent window 7 of the cassette, or over a reduced part, by using lenses with different magnifying powers, associated with adjustable diaphragms or a slide with holes lodged above the condenser.

It is also possible to provide for a motorization of the reading table, the buttons of the manual mechanical control being replaced by pushbuttons governing micro-motors mounted, especially at the ends of shafts 42 and 57.

In addition, it is possible to provide, on the edge of the film, for a magnetic footage marking which, associated with a suitable reading head, makes it possible to perform an automatic search.

On the transparent parts of plate 5, horizontally indexed marking lines may be engraved, traced or drawn, so that it is possible to locate, during projection, the lateral zone which are sought.

The apparatus can, for example, serve as map reader in a vehicle, the maps to be consulted being recorded on the film.

I claim:
1. A microfilm device comprising a cassette having an integral pair of cylindrical chambers joined in separated positions by closely spaced parallel flat surfaces for holding a film in an optical plane of a format area, whereby film may be transported from either chamber between the flat surfaces and through the format area to the other chamber, a chassis having an optical system with an optical axis for projecting an image which is in said optical plane in said format area, cradle means mounted on said chassis and configured with complementary contours for matingly and slidingly receiving said joined chambers in order to support said cassette with a transverse sliding movement of said cassette to an operating position within the cradle means at locations relative to said chassis in order to position said format area in an optical path, shafts associated with said cylindrical chambers for winding and transporting said film in either direction between said chambers while the cassette is in said cradle means, and means for transmitting driving forces to said shafts.

2. The device of claim 1 and spline key way means formed in said shafts and said transmitting means for telescopingly coupling said driving forces between said chassis and said cylindrical chambers regardless of the amount of said transverse movement.

3. The device of claim 1 or claim 2 and at least one control shaft and associated gear train in said chassis for transmitting rotary forces from a control side of said chassis through said gear train to said driving force transmitting means, and means for selectively moving said gear train between wind and rewind positions.

4. The device of claim 3 wherein said gear train includes one gear fixed to said control shaft, said one gear being moved between said wind and rewind positions by pulling and pushing said control shaft.

5. The device of claim 3 and a second control shaft in said chassis, said second control shaft being a threaded feed screw and threaded blocks on said cradle means for imparting said transverse movement to said cassette responsive to rotation of said feed screw.

6. The device of claim 3 and locking means for locking said cassette into said cradle means, and means responsive to said transverse movement into and out of a normal position for unlocking and locking said locking means.

7. The device of claim 3 and means for projecting an image on film in said format area on to the back of a screen associated with said chassis.

8. The device of claim 7 and means for selectively projecting said image through any of a plurality of alternative lenses to enable a selection of a magnitude of enlargements.

9. The device of claim 3 and spring biased means for holding a tension in said film during winding and rewinding.

* * * * *